US011036722B2

(12) United States Patent
Hornkvist

(10) Patent No.: US 11,036,722 B2
(45) Date of Patent: Jun. 15, 2021

(54) PROVIDING AN APPLICATION SPECIFIC EXTENDED SEARCH CAPABILITY

(71) Applicant: Apple Inc., Cupertino, CA (US)

(72) Inventor: John M. Hornkvist, Cupertino, CA (US)

(73) Assignee: Apple Inc., Cupertino, CA (US)

(*) Notice: Subject to any disclaimer, the term of this patent is extended or adjusted under 35 U.S.C. 154(b) by 103 days.

(21) Appl. No.: 15/616,877

(22) Filed: Jun. 7, 2017

(65) Prior Publication Data
US 2017/0357688 A1 Dec. 14, 2017

Related U.S. Application Data

(60) Provisional application No. 62/349,106, filed on Jun. 12, 2016.

(51) Int. Cl.
G06F 16/242 (2019.01)
G06F 16/14 (2019.01)
G06F 16/16 (2019.01)
G06F 40/40 (2020.01)

(52) U.S. Cl.
CPC ........ G06F 16/2423 (2019.01); G06F 16/148 (2019.01); G06F 16/164 (2019.01); G06F 16/2428 (2019.01); G06F 40/40 (2020.01)

(58) Field of Classification Search
CPC .. G06F 16/2423; G06F 40/40; G06F 16/2428; G06F 16/148; G06F 16/164
See application file for complete search history.

(56) References Cited

U.S. PATENT DOCUMENTS

| 7,437,358 | B2 | 10/2008 | Arrouye et al. | |
| 8,713,042 | B1 | 4/2014 | Zinenko et al. | |
| 9,342,601 | B1 | 5/2016 | Finkelstein et al. | |
| 2003/0195865 | A1 | 10/2003 | Long et al. | |
| 2005/0027796 | A1* | 2/2005 | San Andres | G06F 11/201 |
| | | | | 709/203 |
| 2005/0289109 | A1 | 12/2005 | Arrouye et al. | |
| 2007/0226640 | A1* | 9/2007 | Holbrook | G06F 16/951 |
| | | | | 715/765 |
| 2008/0189247 | A1* | 8/2008 | Blinnikka | G06F 16/951 |
| 2009/0125498 | A1 | 5/2009 | Cao et al. | |
| 2010/0094947 | A1* | 4/2010 | Daniell | G06Q 10/107 |
| | | | | 709/206 |
| 2010/0325140 | A1 | 12/2010 | Hubner et al. | |
| 2011/0137884 | A1 | 6/2011 | Anantharajan et al. | |
| 2012/0084291 | A1 | 4/2012 | Chung et al. | |
| 2014/0250147 | A1* | 9/2014 | Shapira | G06F 16/9558 |
| | | | | 707/770 |

(Continued)

Primary Examiner — Cam Y T Truong
(74) Attorney, Agent, or Firm — Womble Bond Dickinson (US) LLP

(57) ABSTRACT

Described is a system (and method) for providing an application specific extended search that is initiated from a system-wide search application such as a "finder" application or service. The extended search may be automatically performed by an application (including a third-party applications) in order to search its own content from the search initiated within the system-wide search application. Accordingly, the system may provide an efficient and familiar search mechanism that provides a seamless extended search capability that may utilize additional search functionality available within particular applications themselves.

18 Claims, 10 Drawing Sheets

(56) References Cited

U.S. PATENT DOCUMENTS

| | | | |
|---|---|---|---|
| 2014/0365462 A1* | 12/2014 | Chang | G06F 16/951 |
| | | | 707/711 |
| 2015/0111190 A1 | 4/2015 | Vittorio | |
| 2015/0309682 A1 | 10/2015 | Lee et al. | |
| 2017/0046436 A1* | 2/2017 | Glover | G06F 16/283 |

* cited by examiner

400

Perform an Initial Search using a Search Application
401
(e.g. perform search via finder application)

Provide a Set of Initial Search Results
402
(e.g. finder application provides search results grouped by content item type)

Determine which Search Results are associated with an Application providing an Extended Search
403
(e.g. determine which content item types are associated with an application indicating an extended search capability)

Provide an Extended Search Option
404
(e.g. include an extended search option for appropriate content item types)

Transmit Search Information to a Specific Application
405
(e.g. send search information via an API to the specific application)

Perform an Extended Search using the Specific Application
406
(e.g. specific application performs an application-specific search)

Provide a Set of Extended Search Results
407
(e.g. display extended search results within the specific application)

PERFORM, BY A SEARCH APPLICATION ON A FIRST DEVICE, AN INITIAL CONTENT ITEM SEARCH IN RESPONSE TO THE SEARCH APPLICATION RECEIVING A SEARCH QUERY
901

PROVIDE AN INITIAL SET OF SEARCH RESULTS WITHIN THE SEARCH APPLICATION, WHEREIN THE INITIAL SET OF SEARCH RESULTS INCLUDE ONE OR MORE CONTENT ITEM TYPES
902

PROVIDE, AS PART OF THE INITIAL SET OF SEARCH RESULTS, AN EXTENDED SEARCH OPTION FOR A FIRST CONTENT ITEM TYPE AMONGST THE ONE OR MORE CONTENT ITEM TYPES
903

TRANSMIT, IN RESPONSE TO RECEIVING A SELECTION OF THE EXTENDED SEARCH OPTION, BY A USER SEARCH INFORMATION CORRESPONDING TO THE SEARCH QUERY TO A FIRST APPLICATION THAT IS ASSOCIATED WITH THE FIRST CONTENT ITEM TYPE
904

PERFORM, BY THE FIRST APPLICATION, AN EXTENDED SEARCH USING THE RECEIVED SEARCH INFORMATION
905

PROVIDE AN EXTENDED SET OF SEARCH RESULTS WITHIN THE FIRST APPLICATION
906

*FIG. 9*

PROVIDING AN APPLICATION SPECIFIC EXTENDED SEARCH CAPABILITY

RELATED APPLICATIONS

This application claims the benefit of U.S. Provisional Patent Application No. 62/349,106, filed Jun. 12, 2016, the entirety of which is incorporated herein by reference.

TECHNICAL FIELD

This disclosure relates generally to the field of searching, and more specifically, providing an application-specific extended search.

BACKGROUND

Many traditional tools exist to search for various types of content within different environments. For example, in an online environment, a search engine may employ various algorithms for ranking search results such as websites. However, when searches are initiated in a local (e.g. offline) environment, traditional tools often rely on search capabilities of a file management application (e.g. file explorer). Current devices, however, often store vast amounts of content including content items not typically accessed by users from a file management application. For example, certain types of content items (although saved as a file in some cases) are typically accessed directly from one or more applications, and not organized in directories traditionally navigated by file management applications. Accordingly, current devices often have interfaces that include a system-wide search mechanism (e.g. a "finder" program) that users initiate as a primary source to access content items. These search mechanisms, however, often search only predefined content item types and not additional content items that, for example, may be associated with add-on applications that are installed on a device. In addition, these search mechanisms may not have direct access to certain sources of content items which further limits their search capabilities. Accordingly, there is a continued need to improve search mechanisms when searching for various types of content.

SUMMARY

In some embodiments, described is a system (and method) for providing an application specific extended search that is initiated from a search application such as a system-wide search application (e.g. a "finder" application or service). Accordingly, the system may provide the ability for an application (including a third-party application) to perform an extended search of its own content from a search initiated within, for example, the system-wide search application. Thus, in some embodiments, the system provides extended search capabilities that allows a developer to tailor search capabilities specific to a particular application while still allowing the user to initiate searches from a system-wide search application.

In some embodiments, the extended search functionality may be provided in response to a selection of a "search more" or similar button or option that may be provided along with a set of search results. For example, in response to a selection of an extended search option, a third-party application may launch and perform a search within (or by) the application itself. For example, in instances where a list of search results becomes extensive, it may be more efficient to conduct a search within (or by) a specific application associated with a particular type of content item (e.g. email application, social networking application, etc.). In addition, by performing the search by a specific application, additional search features or capabilities may be provided. For example, an extended search may allow searching for additional content sources, which may not necessarily be available to the system-wide search application. In addition, in some embodiments, an authentication (e.g. verifying a user account) may be performed in order to access additional search functionality as part of the extended search. For example, an application may authenticate a user account associated with a specific application to access additional data sources (e.g. remote email server, social networking website, media streaming service, etc.).

For example, after performing a search on a system-wide search application, a list of contacts may be displayed. In response to selecting an extended search option for contacts, an application associated with contacts may be launched (e.g. social networking application), and an extended search such as searching private contacts maintained by a social network website may be performed.

In addition, in some embodiments, to allow a specific application (e.g. a third-party application) to perform the extended search, an application programming interface (API) may be provided. For example, the API may provide a protocol to allow certain applications to subscribe to the application specific extended search with respect to various content item types.

Accordingly, some embodiments as further described herein provide an efficient and familiar search mechanism that provides a seamless extended search capability that may utilize additional search functionality available to particular applications themselves.

BRIEF DESCRIPTION OF THE DRAWINGS

Embodiments of the disclosure are illustrated by way of example, and not by way of limitation, in the figures of the accompanying drawings in which like reference numerals refer to similar elements.

FIG. 4 is an example process flow diagram of performing an extended search according to an embodiment of the disclosure.

FIG. 6 is a diagram illustrating an example GUI of a mail application providing extended search results according to an embodiment of the disclosure.

FIG. 9 is an example flow diagram of a method of providing an extended search according to an embodiment of the disclosure.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
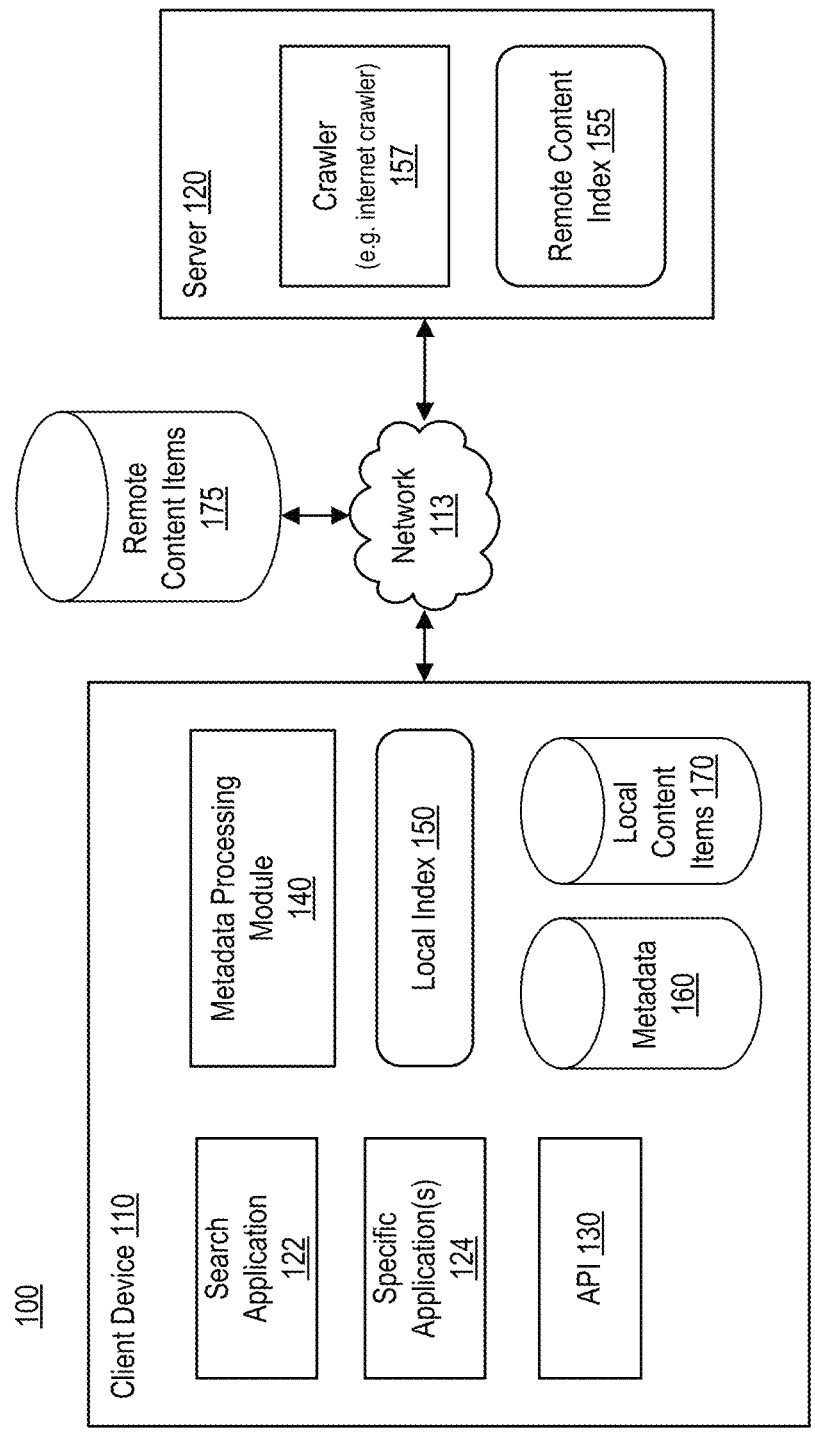
FIG. 1 is a block diagram illustrating an example operating environment providing an extended search capability according to an embodiment of the disclosure.

As described above, the disclosure relates to providing extended search results for content items, which may be provided within an operating environment as shown in FIG. 1.

FIG. 1 is a block diagram illustrating an example of an operating environment according an embodiment of the disclosure. The system 100 may include a client device 110 and server 120, which may be connected via a network 113. The network 113 may be any suitable type of wired or wireless network such as a local area network (LAN), a wide area network (WAN), or combination thereof. The network may also provide access to remote content items 175 (e.g. internet content).

The client device 110 may be any type of computing device such as a smartphone, tablet, laptop, desktop, wearable device (e.g. smartwatch), set-top-box, interactive speaker, etc., and the server 120 may be any kind of server or data source (or computing device, or another client device 110, or remote storage, etc.), which may be a standalone device, or part of a cluster of servers, and may include a cloud-based server, application server, backend server, or combination thereof.

The client device 110 may include various components or modules to perform various operations as described herein. The client device 110 may include a metadata processing module 140 that may process and collect various forms of metadata 160. Accordingly, the metadata processing module 140 may access metadata 160, as well as one or more indexes.

As referred to herein, metadata 160 may include any information (e.g. text) that may include characteristics, attributes, and the like, that may be associated with particular content items (local content items 170 and remote content items 175). The metadata 160 may be stored as part of a content item, and/or may be stored separately (e.g. within a database or file). The metadata 160 may include information stored in any suitable format (e.g. metadata entries, fields, objects, files, etc.). In one embodiment, metadata 160 may be stored in a flat file format in order to improve the speed of retrieval of information in most circumstances. In one embodiment, metadata (e.g. if a metadata object or file) will itself contain entries or fields. In addition, the metadata may include information from different applications and a specific type of metadata may be created for each of the applications. In one embodiment, metadata may include a persistent identifier that uniquely identifies its associated content item. For example, this identifier remains the same even if the name of the file is changed or the file is modified. This allows for the persistent association between the particular content item and its metadata.

In addition, non-limiting examples of metadata may be found in commonly assigned U.S. Pat. No. 7,437,358, issued Oct. 14, 1998, the entirety of which is incorporated herein by reference.

The operating environment 100 may include a local index 150 for local content items 170 and/or metadata 160, and a remote content items index 155 for remote content items 175. As referred to herein, content items may include content items stored on a particular device (e.g. local content items 170) such as documents, emails, messages, pictures, media, applications, contacts, calendar items, reminders, folders, browser history, bookmarks, posts, and the like, as well as content items from remote sources (e.g. remote content items 175) including websites, webpages, applications, map information, reviews, retail items (e.g. from a particular online retailer), downloadable or streamed media (e.g. music, videos, eBooks, etc.), pictures, social media content (e.g. posts, pictures, messages, contacts, etc.), and the like. It should be noted that in one embodiment, the local and remote content items are not mutually exclusive, and accordingly, remote content items 175 may be local content items 170 (and vice versa).

The indexes may include identifiers or representations of the content items and these indexes may be designed to allow a user to rapidly locate a wide variety of content items. These indexes may index metadata 160 associated with content items (e.g. local content items 170 and remote content items 175), as well as index the contents of these content items. In some embodiments, the local content items index 150 may be updated continuously (e.g. as content items are created, modified, etc.) using a background process (e.g. daemon) executing on a device. Similarly, the remote content items index 155 may be updated using a crawler 157 such as an internet crawler. For example, crawler 157 may retrieve (e.g. "crawl") for information from various websites, as well as from third-party providers. For example, crawler 157 may retrieve metadata relating to, for example, multimedia content items (e.g. music, movies, audio book, etc.) provided by third-party providers that may be accessed via a user account with the third-party provider. For instance, the system (e.g. crawler 157) may coordinate with a third-party provider (via an API) to provide searchable metadata for online content items to which the user may subscribe.

As shown in the embodiment of this figure, the local content items index 150 and remote content item index 155 may be stored on separate devices. For example, in one embodiment, the system may distinguish between private data (e.g. local content items 170) stored on the device, and the remote content items 175 (e.g. non-local content items)

that may be accessed from remote sources such as the internet or third-parties. In one embodiment, the system may secure the local content items 170 and metadata 160, by incorporating a firewall or other features to maintain the privacy of a user content. In one embodiment, components that are part of a server may also be part of the client device 110, and accordingly, the system may secure these components using various techniques such as "sandboxing." For example, sandboxing may include compartmentalizing resources (e.g. data, memory addresses, processes, features, etc.) that one or more components (or applications) are allowed to access on the client device 110. In addition, various encryption mechanisms may also be employed to secure content items 170 or metadata 160. It should be noted that although the content items are shown as a local (e.g. private) versus remote dichotomy, in some embodiments, metadata (or content items) from remote sources may be stored locally on the client device 110, and some local content items 170 may be accessed from a remote source (e.g. another client device 110, or server 120).

The client device 110 may also include a search application 122, which may provide an interface for receiving a search query and may initiate a search for content items as further described herein. The search application 122 may be provided as part of an operating system of the device. For example, the search application 122 may be a system-wide search application that allows a user to search content items (e.g. local content items 170 and/or remote content items 175). In one embodiment, the system may primarily search for local content items, but may also include a set of predefined (or user defined) remote content items. For example, in one embodiment, the search application 122 may allow a user to search for local content items 170, and accordingly, the search application 122 may act as a finder application to locate content that has been stored or saved to the client device 110.

The client device 110 may include one or more specific applications 124, which may include applications provided with the device (e.g. packaged with the operating system) as well as third-party applications (e.g. applications installed on the client device 110 by a user). In one embodiment, a third-party may refer to a manufacturer or company other than the manufacturer or company providing the operating system for the device, or the device itself. Specific applications 124 may also include built-in search functionality. For example, an application 124 such as an email application may communicate with the search application 122 via an API (e.g. API 130) to provide an interface for searching for content items. Applications 124 may also work in conjunction with the metadata processing module 140 to search for content items by searching metadata 160, or one or more of the indexes (or content items themselves).

It should be noted that the above search functionality may be performed on the client device 110, or in conjunction with the server 120. For example, the search query may be transmitted to a server 120 for processing, and the server may instruct client device 110 to perform a local search.

As described, the client device 110 may also include an API(s) 130, to allow components (e.g. third-party applications) to access the metadata processing module 140 and other components shown. For example, as further described herein, the API 130 may allow the search application 122 to communicate with the specific application 124 to provide an extended search functionality. As another example, the API 130 may provide a method for transferring data and commands between the metadata processing module 140 and various components of the system. The metadata processing module 140 may also receive data from an importer/exporter via the API 130 that may communicate with various components to provide metadata for certain types of content items. For example, a developer may utilize the API 130 to allow the developers to import or provide an indication of extractable metadata (e.g. metadata 160) for content items specific to a particular application (e.g. specific application 124 such as a third-party application). As described above, the metadata 160 may be used by the search application 122 and/or specific application 124 when performing a search. Accordingly, in some embodiments, the system may allow a specific application 124 to eliminate the need to maintain its own search index, and instead, leverage search technology provided by the operating system of the device. For example, the specific application 124 may perform a content item search that utilizes indexes (e.g. 150 and/or 155) directly within the application itself.

It should be noted that configurations described herein are examples, and various other configurations may be used without departing from the embodiments described herein. For instance, components may be added, omitted, and may interact in various ways known to an ordinary person skilled in the art.

Figure 2:
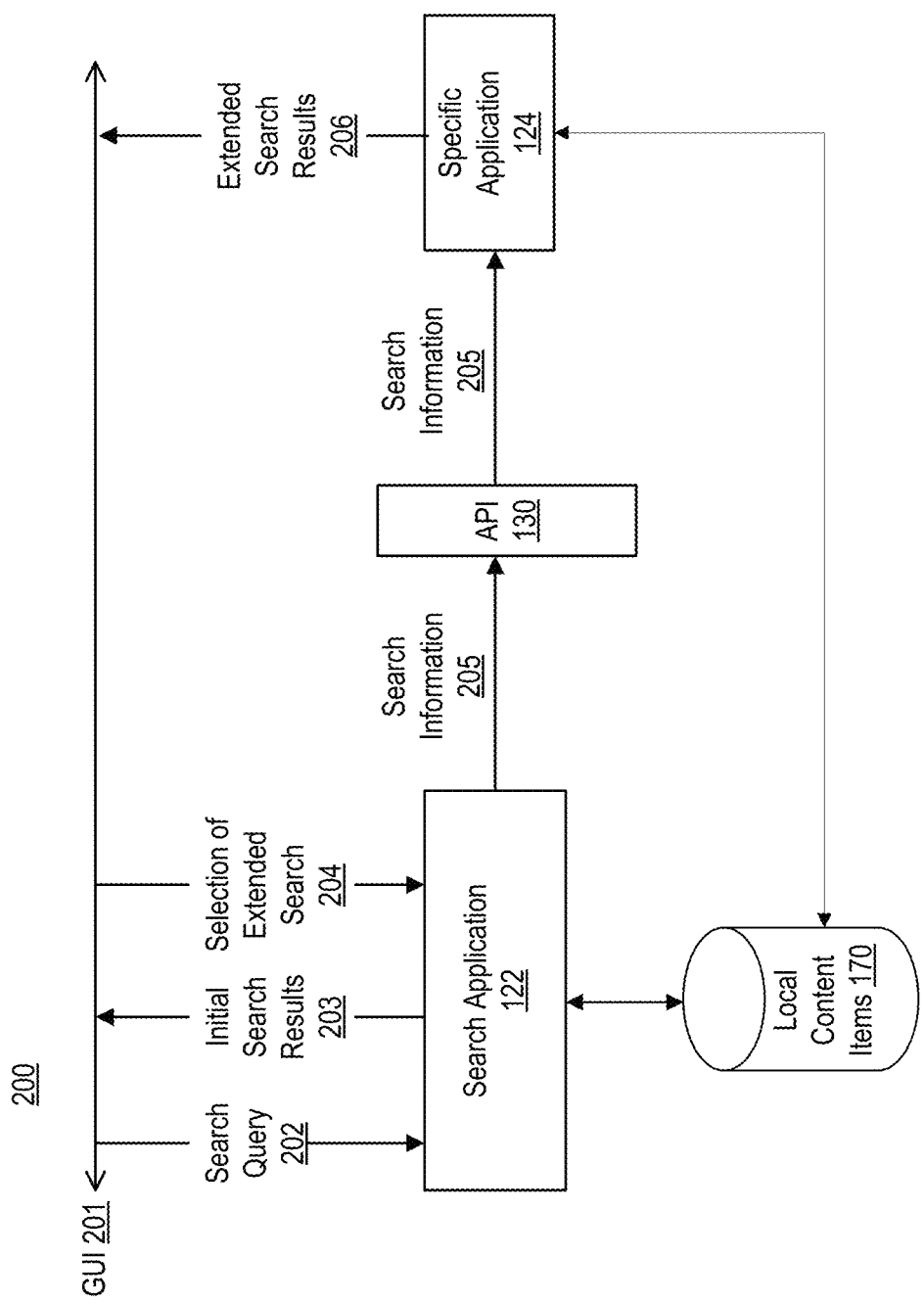
FIG. 2 is a block diagram illustrating an example interaction between components of a system providing an extended search capability from local content according to an embodiment of the disclosure.

FIG. 2 is a block diagram illustrating an example interaction between components of a system (e.g. system 100) providing an extended search capability from local content according to an embodiment of the disclosure. The configuration 200 in this example may enable a user to interact with a graphical user interface (GUI) 201 to obtain extended search results. In one embodiment, the GUI 201 may be part of the user interface provided by an operating system for a device (e.g. client device 110). The search application 122 (e.g. system-wide search application) may receive a search query 202 from a user. In response, the search application 122 may perform a search of local content items 170 as shown in this example. As described, in one embodiment, the local content items 170 may include content stored only locally on a particular device (e.g. client device 110). For example, the particular device may be the device on which the search application may be installed (e.g. particular smartphone, laptop, etc.). Thus, the search application 122 may act as a finder application to allow a user to search for content stored on the particular device. In response to performing a search, the search application 122 may provide initial search results 203. As described above, the system may perform an extended search in response to receiving a selection of an option to perform an extended search 204. The search application 122 may then transmit (provide, send, transfer, etc.) search information 205 to a specific application 124 (e.g. a specific application associated with a particular content item).

In one embodiment, the system may utilize an API 130 as an intermediary when providing search information 205 to a specific application 124. As described above, a third-party application (e.g. third-party developer) may coordinate with the API 130 to provide an extended search within a specific application 124 from a search initiated from the search application 122. In one embodiment, the specific application 124 may utilize the API 130 to allow its content to be indexed by the client device (e.g. in local index 150 via metadata processing module 140). For example, the specific application 124 may update a manifest type file (e.g. info.plist type file) to indicate a capability to provide extended search functionality. The developer of the specific application 124 may then include code to allow it to access API functionality such as objects, methods, libraries, etc. to receive search information 205 for an extended search.

To provide such additional search functionality, the search application 122 (or operating system) may communicate with the specific application 124 using various functions or methods of the API 130. For example, when transmitting the search information 205 to the specific application 124, a text string (or object) may be provided as a parameter to an API function (or method) that provides an extended search functionality. In turn, the API function (or method) may submit the text string as an input for a search function (or method) of the specific application 124. In one embodiment, transmitting the search information to the specific application may include providing the search information 205 as a parameter to a function (or method) of the API 130, and the parameter may be provided as an input to a search function (or method) of the specific application 124. In one embodiment, the search information 205 may include a search string that is provided as a parameter to a search function of the specific application 124. For example, if a user searches the term "Bob Smith" the text string "Bob Smith" may be passed as a parameter to a function of the API 130, and the specific application 124 (e.g. mail application) may perform a search based on the term "Bob Smith" (e.g. search emails including the term Bob Smith).

The API 130 may also provide various other functionality such as providing the search application 122 (or operating system) with the ability to instruct the specific application 124 to perform the extended search by providing an appropriate instruction via the API. The API may also provide functionality with respect to how the extended search option may be displayed (e.g. settings with respect to particular content items, search queries, etc.).

Figure 3:
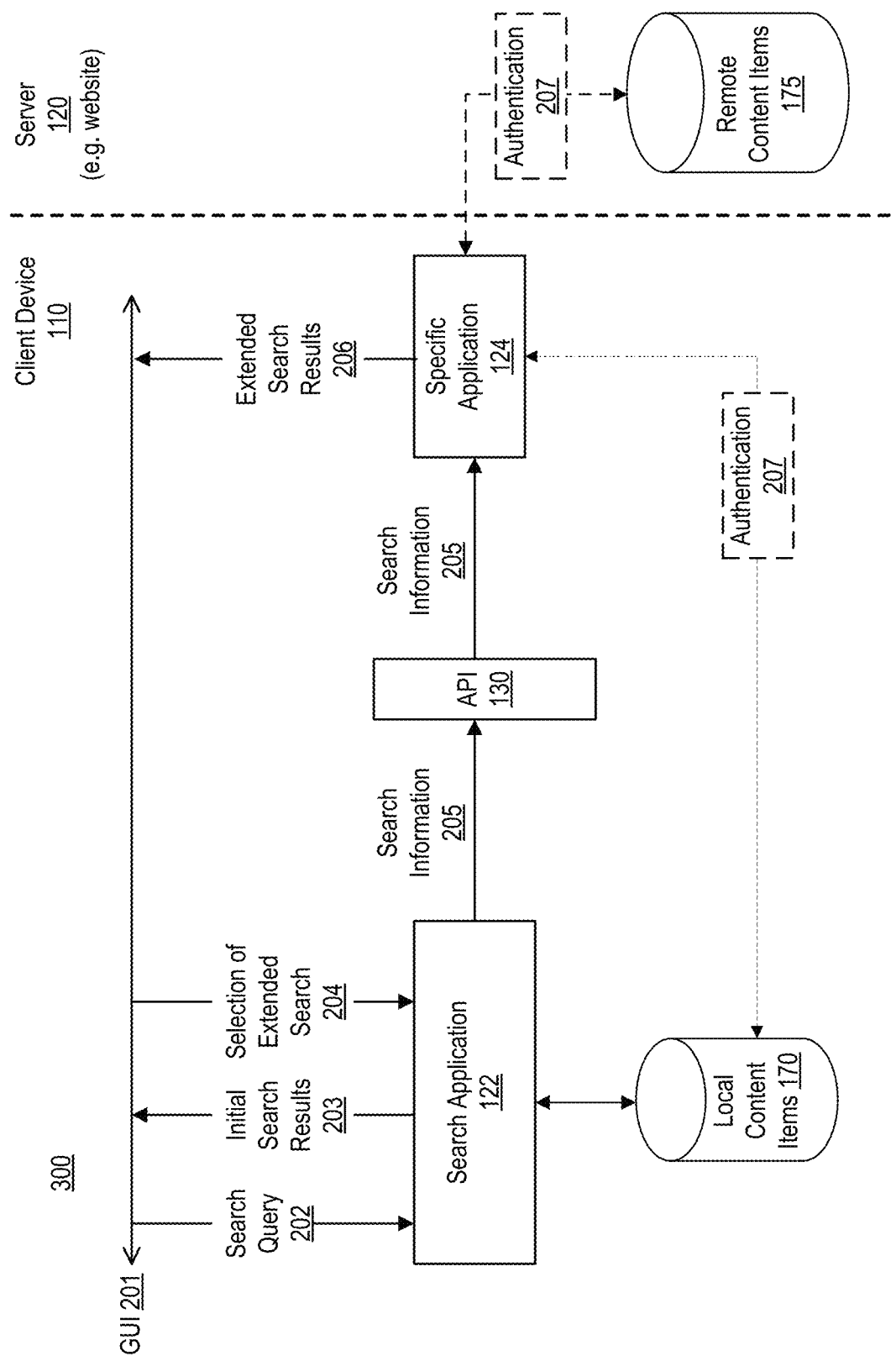
FIG. 3 is a block diagram illustrating an example interaction between components of a system providing an extended search capability from local and remote content according to an embodiment of the disclosure.

Accordingly, the specific application 124 may perform an extended search and provide extended search results 206 to the user. As shown in this example, the specific application may perform the extended search from exclusively from local content items 170. In one embodiment, the specific application 124 may perform the extended search from local content items 170 and/or remote content items 175 as shown in FIG. 3. It should be noted that, as referred to herein, searching local content items 170 and/or remoted content items 175 may include searching associated indexes (e.g. indexes 150 and 155 respectively).

FIG. 3 is a block diagram illustrating an example interaction between components of a system providing an extended search capability from local and/or remote content according to an embodiment of the disclosure. As shown in this example confirmation 300, the local content items 170 may reside on a client device 110, and the remote content items may reside on a server 120. For example, the server 120 may include an email server, website (e.g. social network, online streaming service, etc.), and any other data sources. In one embodiment, the specific application 124 may perform the extended search from local content items 170 and/or remote content items 175. In addition, in one embodiment, the specific application 124 may perform the extended search exclusively from remote content items 175.

In one embodiment, as part of the extended search, the specific application 124 may perform an authentication 207 in order to search local content items 170 and/or additional data sources (e.g. remote content items 175). In one embodiment, the specific application 124 may store authentication information on the client device 110 (e.g. device to which the specific application is installed). Accordingly, in such embodiments, an extended search that requires an authentication may be performed without requiring the user to provide any additional input subsequent the input to perform the extended search (e.g. extended search option 36). For example, the initial search results 203 may include a content item type related to a social networking site (e.g. contacts, posts, etc.), and in response to a selection to perform an extended search for the content item, a social networking application (e.g. specific application 124) may automatically launch and perform a search of a social network website (e.g. server 120). As described above, in some embodiments, the social networking application may automatically authenticate the user (e.g. verify saved login credentials) in order to search private content from the social networking website. For example, private content may include content that may not accessible without a user logging into their account. It should be noted that private content may be user defined. For example, private content may be based on settings within the social networking website or specifically with respect to content that may be searchable from a system-wide search application.

In another example, the specific application may be an application corresponding to an online media download or streaming service. For example, the extended search may include searching online media content and the system may automatically authenticate a user's subscription to the service when providing extended search results. For instance, the system may automatically authenticate the user and provide access to such online media content without requiring the user to provide additional input beyond the selection to perform an extended search. In another example, the system may provide a prompt for the user to provide authentication information (e.g. username and password).

It should be noted that as described above, in one embodiment, remote content items 175 may include content from additional data sources not contained on the client device 110, and may not necessarily be "public" in the sense that it is accessible to any user. For example, remote content items 175 may include an email server, website, subscription to download or streaming service, or additional sources that require some form of authentication (e.g. user/device authentication) in order to be accessed.

FIG. 4 is an example process flow diagram of performing an extended search according to an embodiment of the disclosure. Process 400 may use processing logic, which may include software, hardware, or a combination thereof. For example, process 900 may be performed by a system (e.g. or client device). In 401, the system (e.g. system 100) may perform an initial search for content items (e.g. content items 170 or 175) using a search application (e.g. search application 122). For example, the search may be performed in response to a search query from a user. As described above, in one embodiment, the search application may be a system-wide (or device-wide) search application such as a "finder" application. For example, the search application may search for local content items 170, or a combination of local 170 and remote content items 175. As described above, in one embodiment, the search application may be provided (e.g. packaged) as part of the operating system of a device. Accordingly, in some embodiments, the search application may have authorization to access content or indexes (e.g. indexes 150 and 155), or perform functions that may not be available to other applications (e.g. specific application 124). In one embodiment, a specific application 124 may coordinate with, for example, a metadata processing module 140 and content items associated with a third-party application may be referenced in index 150. Accordingly, in some embodiments, specific applications may leverage the indexing mechanisms utilized by a system-wide search application.

In 402, the search application may provide an initial set of search results. The search results may include one or more different types of content items (e.g. emails, contacts, etc., as described above). When providing the search results, the system may organize the results using various techniques. These techniques may include various ranking mechanisms known to a person of ordinary skill in the art to provide results in a relevant manner. For example, the search results may be organized in various configurations such as by date, user defined preferences, selected filters, etc. In one embodiment, the search results may be grouped by content item type (e.g. as shown in FIG. 5).

In 403, the system may determine which search results are associated with an application providing an extended search. For example, as part of a search API (e.g. API 130), a specific application (e.g. specific application 124) may provide an indication that it has the capability to provide an extended search. For instance, upon installation, a specific application (e.g. third-party application) may set a corresponding parameter (e.g. flag) indicating that it is capable of providing an extended search. Accordingly, the search application may cross-reference such a parameter with content item types included within a particular set of search results.

In 404, the system may provide an option to perform an extended search based on the determination of 403. The option to perform an extended search may be provided as part of the initial set of search results. For example, an option to select an extended search may be displayed in association with one or more groups of content item types.

Figure 5:
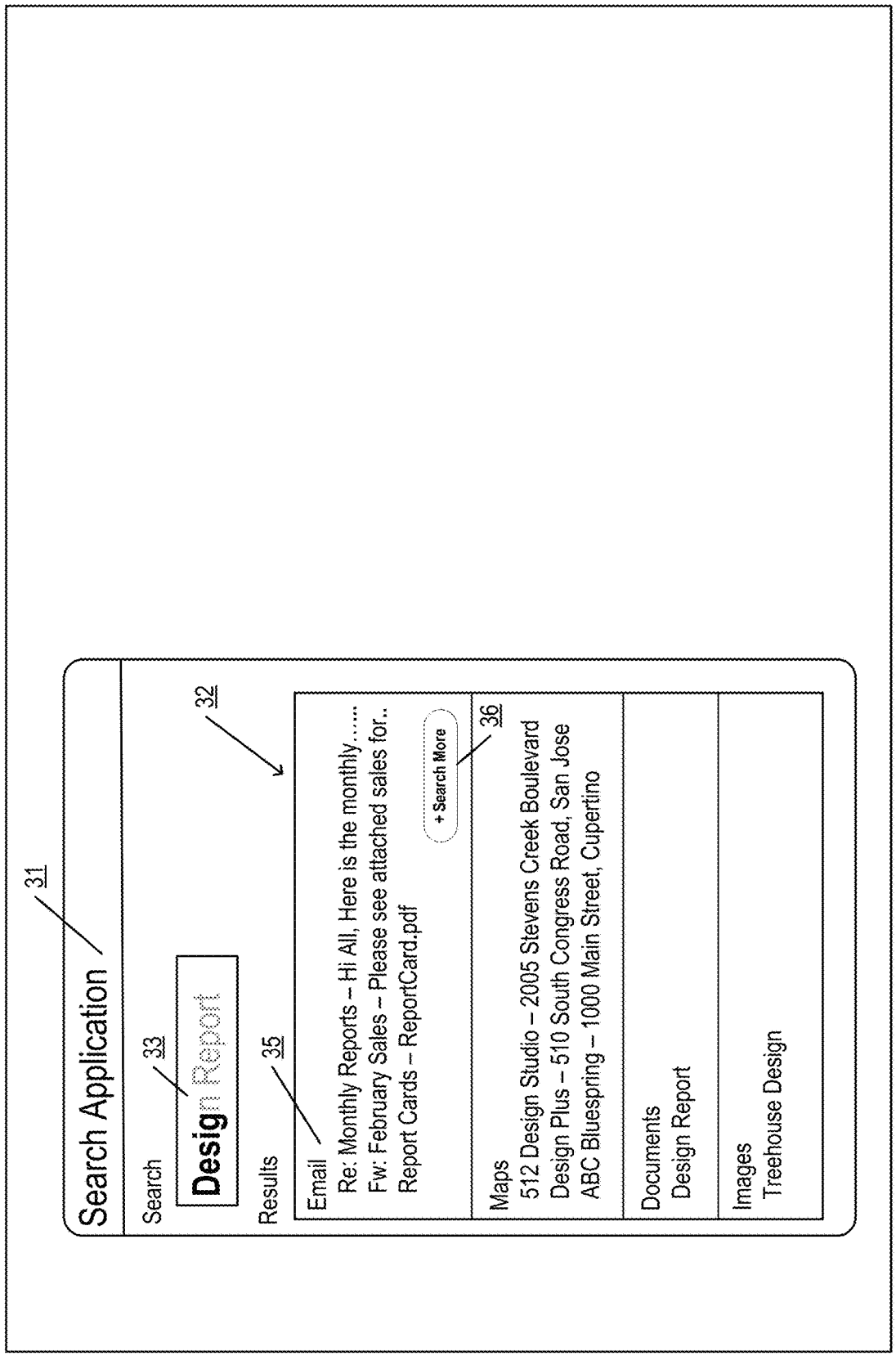
FIG. 5 is an example diagram illustrating an example GUI of a search application providing an extended search option as part of an initial set of search results according to an embodiment of the disclosure.

For example, FIG. 5 is an example diagram illustrating an example GUI of a search application providing an extended search option as part of an initial set of search results according to an embodiment of the disclosure.

As shown, the search application 31 may provide an initial set of search results 32 in response to a user entering a search query 33. As shown in this example, the search results may be grouped by content item type, which in this case includes email, maps, documents, and images. In addition, as described above, the system may determine which content item types within the search results are associated with an application that provides an extended search capability. For example, as shown in this example, an email content item type 35 is associated with a specific application (e.g. mail application) that provides extended search capabilities. Accordingly, the system may provide an extended search option 36. In this example, the extended search option 36 is provided using a "search more" button, but other descriptions such as "extended search," "search within 'application name,'" or other descriptor that would be known to a person of ordinary skill in the art are also contemplated.

In addition, the extended search option 36 may also be provided using various other formats and technique (e.g. icon, scroll/next feature, etc.) that would be known to a person of ordinary skill in the art, as well provided as an option with each applicable content item, or as a global option for all applicable content item types. In one embodiment, the extended search option 36 may be provided as a standalone option (e.g. in association with a particular application). For example, the extended search option 36 may be provided in association with a particular application (e.g. "search more with 'App Name'"). The extended search option 36 may also be provided based on the type or number of search results. For example, in the event the search application does not provide any search results or limited number of results (e.g. based on a predefined threshold), an extended search option may be provided. For instance, the search application may determine (or predict) an extended search that may be applicable to a particular search query (e.g. an extended search by a particular application).

Returning to FIG. 4, in 405, in response to a user selecting the extended search option, the system may transmit search information (e.g. search information 205) to a specific application (e.g. specific application 124). For example, the system may transmit the search information to the specific application that is associated with the content item type corresponding to the selected extended search option. For instance, using the example as shown in FIG. 5, the system may transmit the search information to the mail application, which is the specific application associated with the email content item type. As referred to herein, search information may include data in any suitable format or structure of data such as a text string, object, function call, etc. The search information may include the search query itself (e.g. the search query string) or other information based on the search query. In one embodiment, the search information may be processed (or pre-processed) by the search application. For example, the search application may provide additional or equivalent search terms, or remove irrelevant terms from the search query when providing the search information to the specific application.

In 406, the specific application may perform an extended search (or subsequent search) using the received search information. For example, the specific application may use the search information as input to an application-specific search function. In order to perform the search, the system may launch (e.g. load, run, execute, etc.) the specific application in response to receiving a selection to perform the extended search. In addition, the specific application may be launched in conjunction with (or before, or after) transmitting the search information to the specific application. By performing the extended search within the specific application, extended search functionality that may otherwise not be available in a system-wide search application may be provided. Accordingly, the extended search capability allows developers to tailor search capabilities specific to a particular application while still allowing the user to initiate searches from a system-wide search application.

In one embodiment, the extended search may search a remote data sources (e.g. server 120), and accordingly, the search of the remote data sources may be initiated by the initial search application (e.g. system-wide search application or "finder" application).

Figure 6:
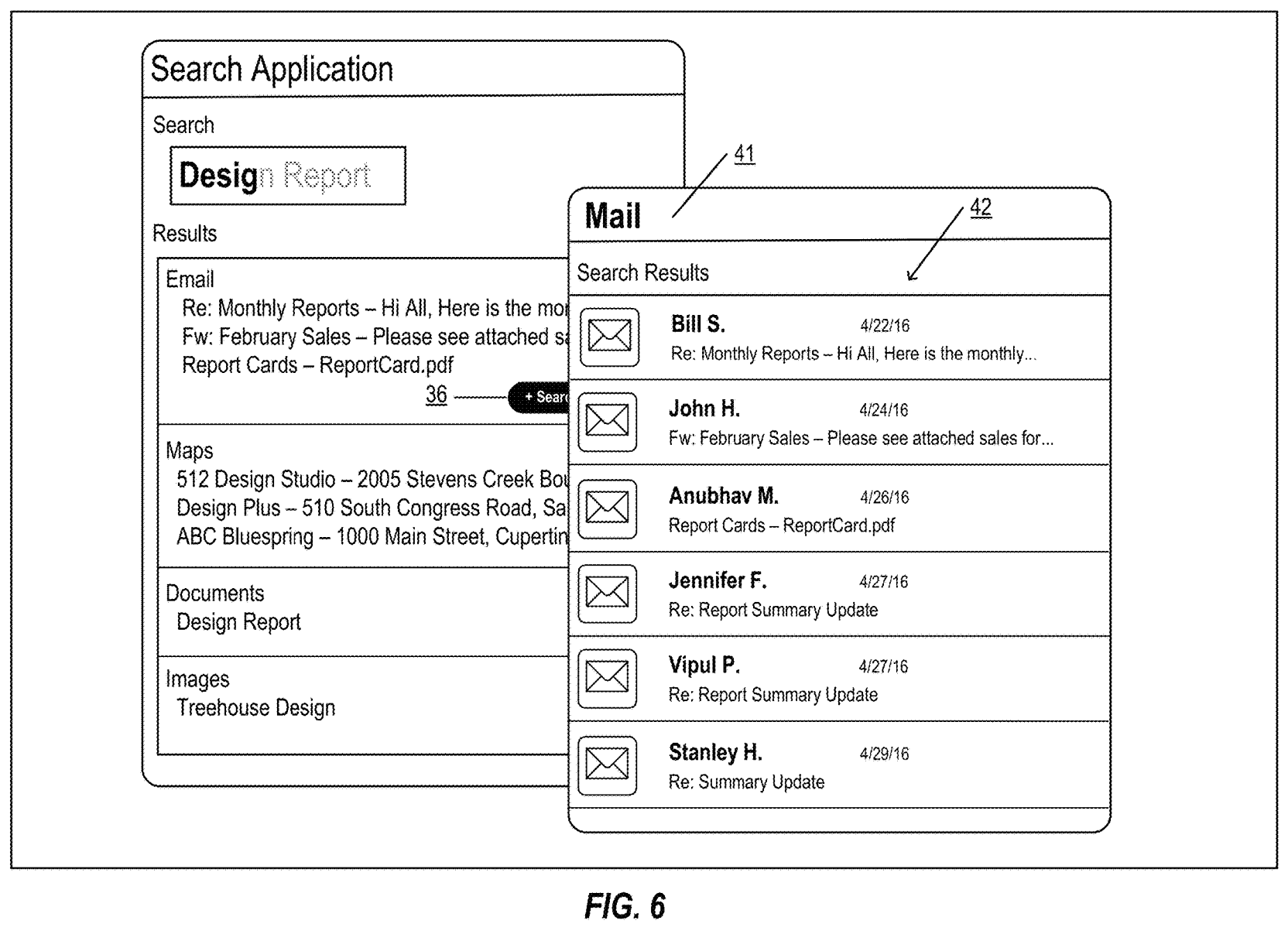

FIG. 6 is a diagram illustrating an example GUI of a mail application providing extended search results according to an embodiment of the disclosure.

As shown, a mail application 41 (e.g. specific application 124) may be launched in response to a user selecting the extended search option (e.g. extended search option 36) for an email content item type. Accordingly, the mail application 41 may perform the extended search within the email application itself to provide an extended set of search results 42. In one embodiment, within may include within a view (or page, window, screen, etc.) provided by an application (e.g. system-wide search application or specific application). In one embodiment, the mail application 41 may search content items (e.g. emails) that the initial search application (e.g. search application 122) may not be able to directly access. For example, the mail application 41 may search additional storages such as a remote mail server (e.g. server 120) that may not be accessible by the search application.

Figure 7:
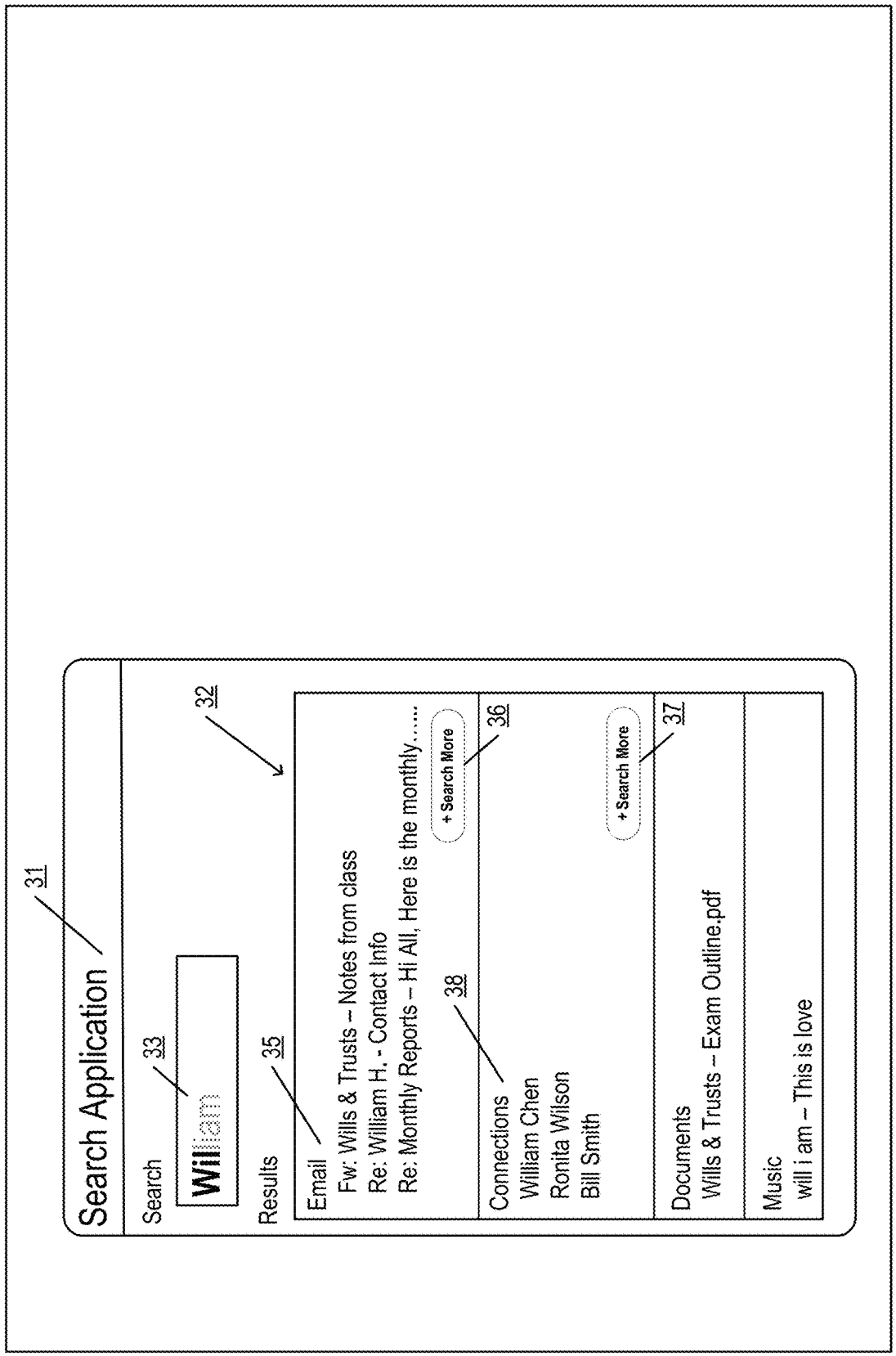
FIG. 7 is another example diagram illustrating an example GUI of a search application providing an extended search option according to an embodiment of the disclosure.
Figure 8:
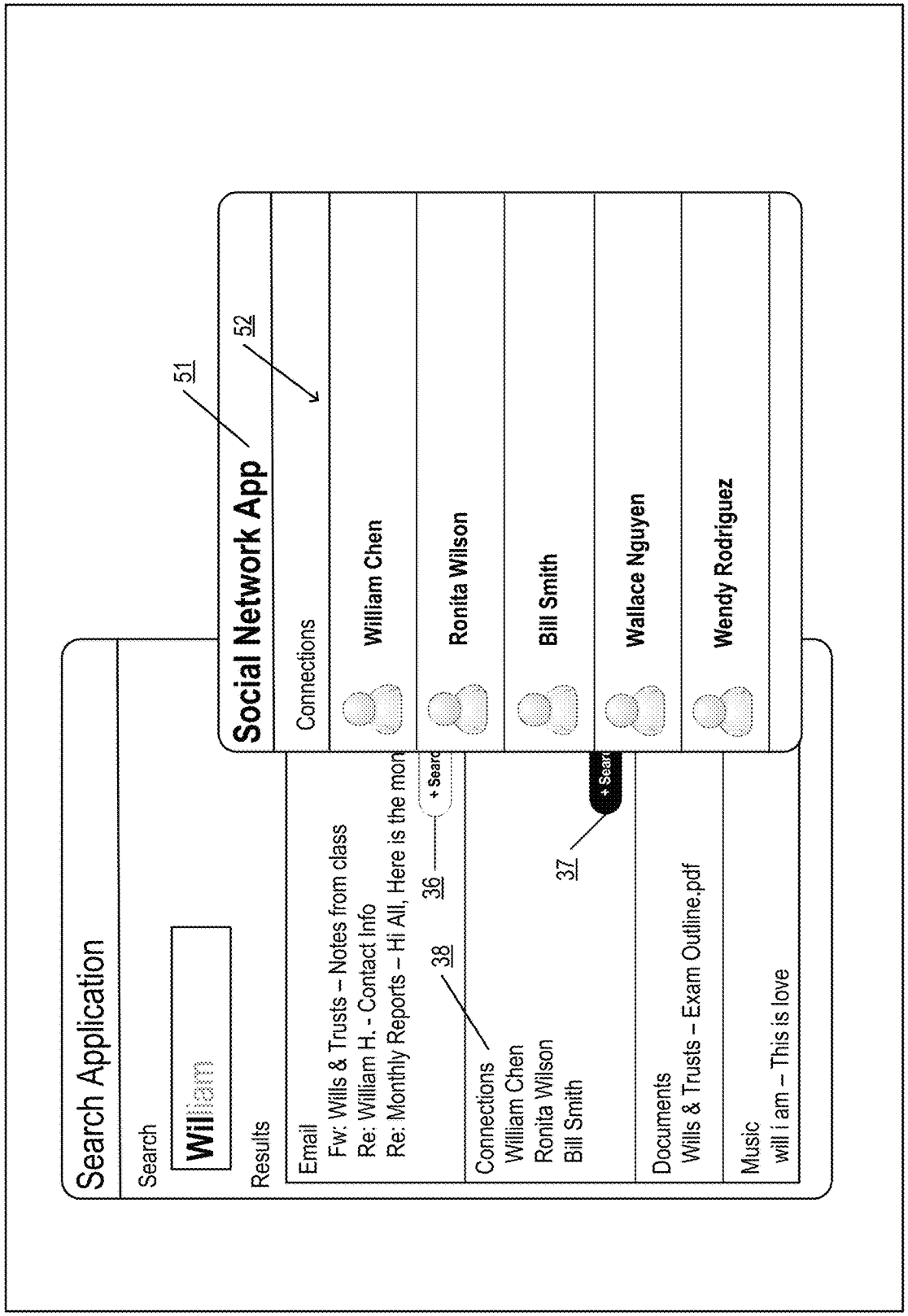
FIG. 8 is diagram illustrating an example GUI of a social networking application providing extended search results according to an embodiment of the disclosure.

FIGS. 7 and 8 show an example illustrating an example GUI of a social networking application providing extended search results according to an embodiment of the disclosure.

FIG. 7 is another example diagram illustrating an example GUI of a search application providing an extended search option according to an embodiment of the disclosure. As shown in a similar manner as described above with respect to FIG. 5, the search application 31 may provide an initial set of search results 32 in response to a user entering a search query 33. As shown in this example, the search results may be grouped by content item type 35, which in this case includes email, connections (or contacts), documents, and music. As described above, the system may determine which content item types within the search results are associated with an application that provides an extended search. As shown in this example, an email content item type 35 and contact content item type 38 are associated with a specific application (e.g. mail application, and social networking application respectively) that provide extended search capabilities. Accordingly, the system may provide an extended search option 36 for email and an extended search option 37 for contact content item types, but not for documents, and music content item types. Accordingly, in the embodiment shown is this example, the specific applications associated with a document and a music content item type, did not provide an indication that they are capable of providing an extended search functionality.

FIG. 8 is diagram illustrating an example GUI of a social networking application providing extended search results according to an embodiment of the disclosure.

As shown, a social networking application 51 (e.g. specific application 124) may be launched in response to a user selecting the extended search option 37 for a contact (or connection) 38 content item type. Accordingly, the social networking application 51 may perform the extended search using the social networking application 51 itself to provide an extended set of search results 52. In one embodiment, the social networking application 51 may search content items (e.g. contacts) from remote content items such as a corresponding social networking website (e.g. server 120). As described above, in one embodiment, searching the remote content items may require performing an authentication (e.g. authentication 207). For example, the system may authenticate a social networking user account in order to search contacts (or connections) that may be deemed private. For example, private connections may include connections only shown to the user's connections within a certain degree (e.g. first-degree connections) and not accessible to the public (e.g. not shown within results of a public search engine).

It should be noted the FIGS. 5-8 are merely examples of content item types associated with an extended search. As described above, other content item types (and corresponding specific applications) may provide an extended search capability. For example, as described above, additional content item types such as downloadable or streamed media (e.g. music, videos, eBooks, etc.), pictures, social media content (e.g. posts, pictures, messages, contacts, etc.), maps, reviews, and the like, may be associated with a specific application that provides an extended search capability as described herein.

FIG. 9 is an example flow diagram illustrating a method of providing an extended search according to an embodiment of the disclosure. Process 900 may use processing logic, which may include software, hardware, or a combination thereof. For example, process 900 may be performed by one or more components of system 100 or client device 110.

In 901, the system may perform, by a search application (e.g. search application 122) on a first device (e.g. client device 110), an initial content item search in response to the search application receiving a search query.

In 902, the system may provide an initial set of search results within a view (e.g. page, window, screen, etc.) provided by the search application, wherein the initial set of search results include one or more content item types. For example, the initial set of search results may be grouped by content item type (e.g. as shown in FIG. 5).

In 903, the system may provide, as part of the initial set of search results, an extended search option (e.g. extended search option 36) for a first content item type amongst the one or more content item types. In one embodiment, providing the extended search option includes determining the first content item type of the initial set of search results is associated with an application that indicates a capability of performing an extended search. In addition, in one embodiment, providing the extended search option includes determining a second content item type amongst the initial set of search results is not associated with an application that indicates a capability of performing an extended search, and the extended search option may be provided for the first content item type and not the second content item type within the initial set of search results (e.g. extended search option 36 provided for email content item type 35, and not provided for maps, documents, and images content item types as shown in FIG. 5).

In 904, the system may transmit, in response to receiving a selection (e.g. input) of the extended search option from a user, search information (e.g. search information 205) corresponding to the search query to a first application (e.g. specific application 124) that is associated with the first content item type. In one embodiment, transmitting the search information to the first application includes providing the search information as a parameter to a function of an application programming interface (e.g. API 130), wherein the parameter may be provided as an input to a search function of the first application. For example, the search information may include a text string corresponding to one or more terms of the search query.

In 905, the system may perform, by the first application, an extended search using the received search information. In one embodiment, performing the extended search includes automatically launching the first application in response to receiving the selection of the extended search option, wherein the first application is launched without further input or selections from the user. In addition, in one embodiment, performing the extended search includes the first application searching a remote data storage (e.g. remote content items 175) not searched during the initial content item search, and wherein searching the remote data storage requires performing an authentication (e.g. authentication 207) of a user account associated with the first application. In one embodiment, the authentication of the user account associated with the first application may be performed without further input or selections from the user.

In 906, the system may provide an extended set of search results within a view (e.g. page, window, screen, etc.) provided the first application. For example, the system may display content items that may be received from remote sources (e.g. email server, website, etc.) within the first application installed on a client device.

Figure 10:
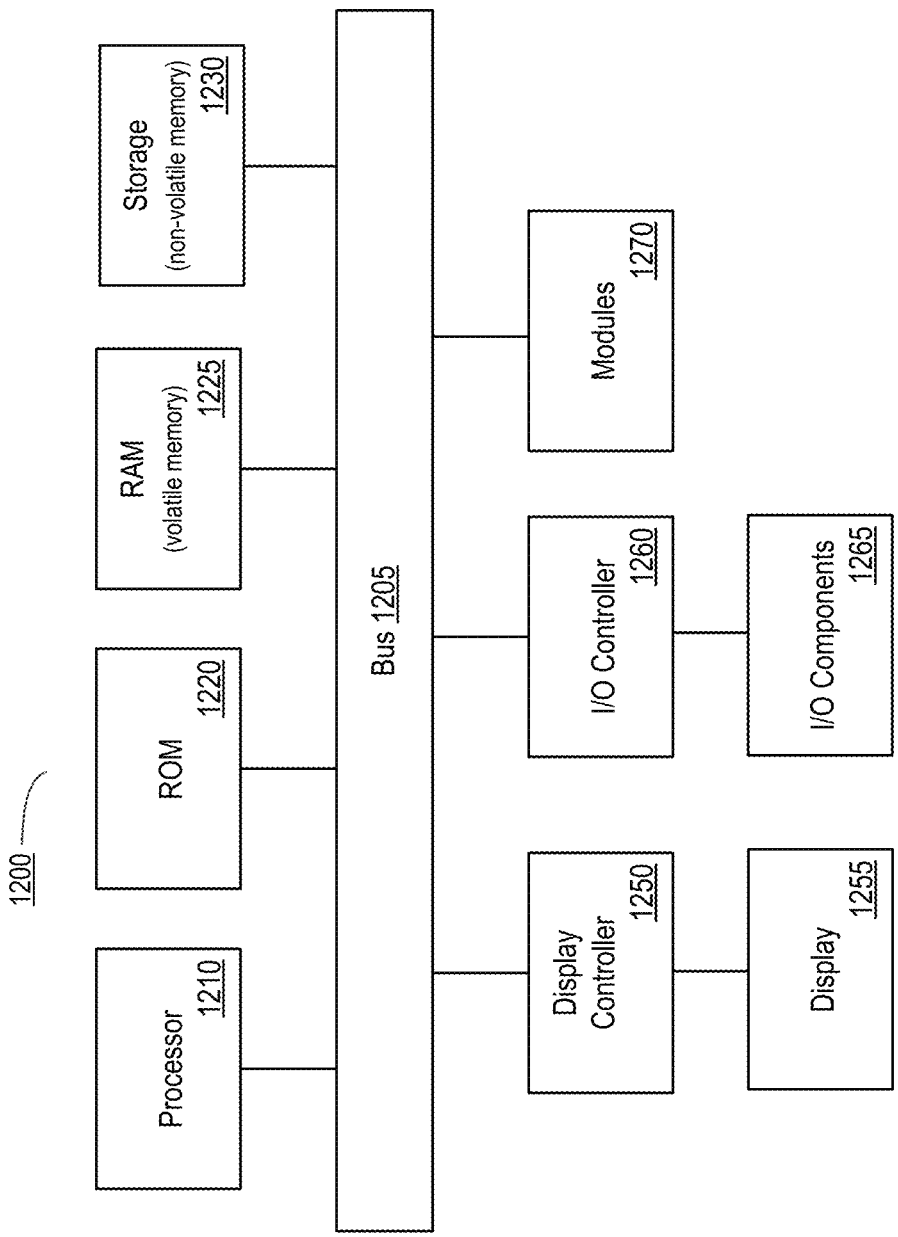
FIG. 10 is a block diagram illustrating an example computing system, which may be used in conjunction with one or more of the embodiments of the disclosure.

FIG. 10 is a block diagram illustrating an example computing system, which may be used in conjunction with one or more of the embodiments of the disclosure. For example, computing system 1200 (or system, or computing device, or device) may represent any of the systems (e.g. system 100), or devices described herein (e.g. client device 110 or server 120) that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor 1210 may retrieve stored instructions from one or more of the memories 1220, 1225, and 1230 and execute the instructions to perform processes, operations, or methods described herein. These memories represent examples of a non-transitory machine-readable medium or storage containing instructions which when executed by a computing system (or a processor), cause the computing system (or processor) to perform operations, processes, or methods described herein. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Modules 1270 (or components, units, or logic) may represent any of the modules described above, such as, for example, search application 122, specific application 124, API 130, metadata processing module 140, and crawler 157 (and related modules, and sub-modules). Modules 1270 may reside, completely or at least partially, within the memories described above, or within a processor during execution thereof by the computing system. In addition, modules 1270 can be implemented as software, firmware, or functional circuitry within the computing system, or as combinations thereof.

The present disclosure recognizes that the use of personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A non-transitory machine-readable medium storing instructions which, when executed by one or more processors of a computing device, cause the computing device to perform operations comprising:
   performing, by a search application on a first device, an initial content item search in response to the search application receiving a search query;
   providing an initial set of search results within a view provided by the search application, wherein the initial set of search results include a plurality of content item types;
   providing, as part of the initial set of search results, an extended search option for a first content item type using at least a first application associated with the first content item type amongst the plurality of content item types, wherein the first application is an application that is different than the search application and the first content item type indicates a class of objects associated with the first application and the first application processes an object of the class of objects and provides the extended search option includes:
     determining the first content item type of the initial set of search results is associated with the first application that indicates a performing of an extended search, and
     determining a second content item type amongst the initial set of search results is not associated with an application that indicates a performing of the extended search, and wherein the extended search option is provided for the first content item type and is not provided for the second content item type within the initial set of search results;

transmitting, in response to receiving a selection of the extended search option from a user, search information that corresponding to the search query to the first application that is associated with the first content item type, wherein the transmitting of the search information to the first application includes providing the search information as a parameter to a function of an application programming interface (API), wherein the parameter is provided as an input to a search function of the first application;

performing, by the first application executing on the first device, an extended search using the search information for one or more objects of the class of the first application to contain an extended set of search results; and providing the extended set of search results within a view provided by the first application.

2. The non-transitory machine-readable medium of claim 1, wherein performing the extended search includes automatically launching the first application in response to receiving the selection of the extended search option, wherein the first application is launched without further input or selections from the user.

3. The non-transitory machine-readable medium of claim 1, wherein performing the extended search includes the first application searching a remote data storage that is not searched during initial content item type search, and wherein searching the remote data storage requires performing an authentication of a user account associated with the first application.

4. The non-transitory machine-readable medium of claim 3, wherein the authentication of the user account associated with the first application is performed without further input or selections from the user.

5. The non-transitory machine-readable medium of claim 1, wherein the search information is a text string corresponding to one or more terms of the search query.

6. The non-transitory machine-readable medium of claim 1, wherein the first application is selected from the group consisting of email application, maps application, word processing application, contacts application, music application, and image processing application.

7. The non-transitory machine-readable medium of claim 1, wherein the extended search option is a user interface object that is presented to a user.

8. The non-transitory machine-readable medium of claim 1, wherein the initial set of search results includes a plurality of content item types and the initial set of search results are grouped by the plurality of content types.

9. The non-transitory machine-readable medium of claim 8, wherein there is an extended search option provided for each content type of the plurality of content types.

10. The non-transitory machine-readable medium of claim 1, wherein the search application searches local storage of the first device.

11. A method, comprising:

performing, by a search application on a first device, an initial content item search in response to the search application receiving a search query;

providing an initial set of search results within the search application, wherein the initial set of search results include a plurality of content item types;

providing, as part of the initial set of search results, an extended search option for a first content item type using at least a first application associated with the first content item type amongst the plurality of content item types, wherein the first application is an application that is different than the search application, the first content item type defines indicates a class of objects associated with the first application and the first application processes an object of the class of objects, and provides the extended search option includes:

determining the first content item type of the initial set of search results is associated with the first application that indicates a performing of an extended search, and determining a second content item type amongst the initial set of search results is not associated with an application that indicates a performing of the extended search, wherein the extended search option is provided for the first content item type and is not provided for the second content item type within the initial set of search results;

transmitting, in response to receiving a selection of the extended search option from a user, search information that corresponding to the search query to the first application that is associated with the first content item type, wherein the transmitting of the search information to the first application includes providing the search information as a parameter to a function of an application programming interface (API), wherein the parameter is provided as an input to a search function of the first application; and performing, by the first application executing on the first device, the extended search using the search information for one or more objects of the class of the first application to obtain extended set of search results; and providing the extended set of search results within the first application.

12. The method of claim 11, wherein performing the extended search includes automatically launching the first application in response to receiving the selection of the extended search option, wherein the first application is launched without further input or selections from the user.

13. The method of claim 11, wherein performing the extended search includes the first application searching a remote data storage that is not searched during the initial content item search, and wherein searching the remote data storage requires performing an authentication of a user account associated with the first application.

14. The method of claim 13, wherein the authentication of the user account associated with the first application is performed without further input or selections from the user.

15. The method of claim 11, wherein the search information is a text string corresponding to one or more terms of the search query.

16. A device, comprising:

a processor;

and a memory coupled to the processor, the memory storing instructions, which when executed by the processor, cause the processor to perform operations comprising:

performing, by a search application on a first device, an initial content item search in response to the search application receiving a search query;

providing an initial set of search results within the search application, wherein the initial set of search results include a plurality of content item types;

providing, as part of the initial set of search results, an extended search option for a first content item type using at least a first application associated with the first content item type amongst the plurality of content item types, wherein the first application is an application that is different than the search application and the first content item type indicates a class of objects associated with first application and the first application processes an object of the class of objects and provides the extended search option includes:
  determining the first content item type of the initial set of search results is associated with the first application that indicates a performing of an extended search, and
  determining a second content item type amongst the initial set of search results is not associated with an application that indicates a performing of the extended search, and wherein the extended search option is provided for the first content item type and is not provided for the second content item type within the initial set of search results;
  transmitting, in response to receiving a selection of the extended search option from a user, search information that corresponding to the search query to the first application that is associated with the first content item type, wherein the transmitting of the search information to the first application includes providing the search information as a parameter to a function of an application programming interface (API), wherein the parameter is provided as an input to a search function of the first application;
  performing, by the first application executing on the first device, the extended search using the search information for one or more objects of the class of the first application to obtain extended set of search results, wherein performing the extended search includes:
    automatically launching the first application in response to the receiving the selection of the extended search option, wherein the first application is launched without further input or selections from the user, and searching a remote data storage that is not searched during the initial content item search, wherein the searching the remote data storage requires performing an authentication of a user account associated with the first application; and
  providing the extended set of search results within the first application.

17. The device of claim 16, wherein the authentication of the user account associated with the first application is performed without further input or selections from the user.

18. The device of claim 16, wherein the search information is a text string corresponding to one or more terms of the search query.

* * * * *